Aug. 14, 1962   H. J. ADDISON, JR., ET AL   3,049,610
ELECTRIC ARC WELDING METHOD
Filed Oct. 18, 1960
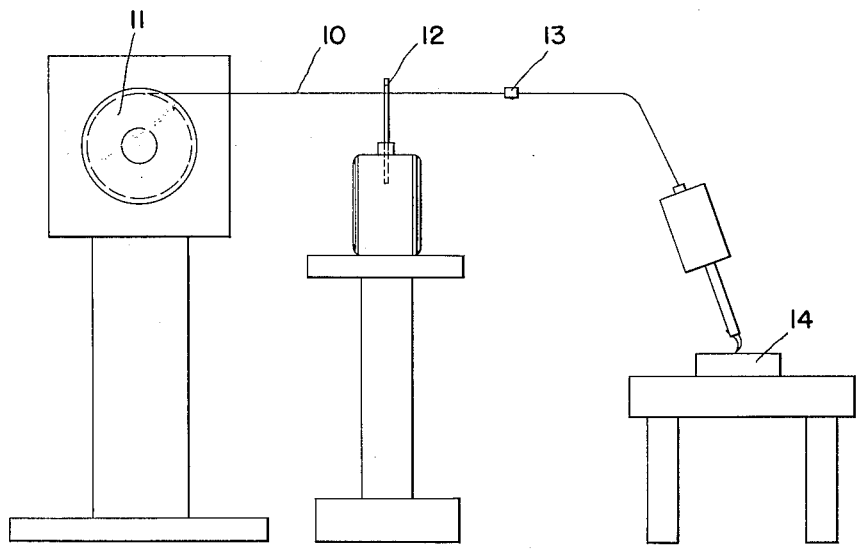
INVENTORS
HARRY J. ADDISON JR.
KURT RITTHALER
BY
ATTORNEYS:

3,049,610
ELECTRIC ARC WELDING METHOD

Harry J. Addison, Jr., and Kurt Ritthaler, Philadelphia, Pa., assignors to the United States of America as represented by the Secretary of the Army
Filed Oct. 18, 1960, Ser. No. 63,452
2 Claims. (Cl. 219—137)
(Granted under Title 35, U.S. Code (1952), sec. 266)

The invention described herein may be manufactured and used by or for the Government for governmental purposes without the payment to us of any royalty thereon.

The present application is a continuation-in-part of our application Serial No. 837,299 filed August 31, 1959, in the names of Harry J. Addison, Jr., and Kurt Ritthaler for "Electric Arc Welding Method," now abandoned.

This invention relates to methods of inert-gas-shielded electric arc (consumable electrode) welding and more especially to an improved welding method whereby the spattering of molten electrode material is either eliminated or minimized.

Presently available welding wires have not been altogether satisfactory in use for the reason that they tend to introduce into the welding arc an instability which produces spattering of melted electrode material on areas where it is not desired. As a result, this spattered material must be removed by hand chipping or some machining operation. These are time consuming and expensive operations which add materially to the cost of the final product.

It has been proposed to avoid this difficulty by degreasing the welding wire prior to its use. This is accomplished by unwinding the "as received" wire from the spool and passing it through an apparatus which removes the residual drawing compounds. The electrode wire is then rewound onto the spool. This expensive operation, however, is not effective to eliminate spattering completely. In fact, past experience indicates that spatter may be minimized only if a trace of the drawing lubricant is left on the electrode wire.

The spatter collected upon the weldment does not necessarily indicate total spatter loss. Some spatter is lost to the surroundings and therefore does not fall upon the weldment. For example, our testing has indicated that at least 273% by weight more metal may be lost to the surroundings when the "as received" electrode wire is used without our coating. Furthermore, in some instances, the unstable electrical conditions in the arc were so pronounced that in addition to an excessive amount of spatter being deposited, the overlay surface was so irregular in contour that the electrode wire could not be used. The method hereinafter disclosed produces a very substantial reduction in the total weight of material lost as spatter and contributes to the deposition of welds having desirable contours.

The invention will be better understood from the following description when considered in connection with the accompanying drawing and its scope is indicated by the appended claims.

The single figure of the drawing illustrates an inert-gas-shielded metal arc (consumable electrode) welding apparatus which forms no part of the present invention but may be used in carrying out the method about to be described.

In accordance with this method, a welding wire 10 is drawn from a spool 11 through a wick 12 and a wiper 13 from which it passes to a welding arc between it and a weldment 14. The wick 12 extends into a vessel containing an aqueous solution of sodium chloride. As it passes through the wick the wire receives a coating of this solution, any excess solution being removed by the wiper 13. The residue of the solution is carried by the wire into the arc where it stabilizes the electrical forces of the arc, promotes a better spray type transfer of metal and minimizes or eliminates the objectionable spattering.

We have found that excellent non-spattering welding performances may be expected when the sodium chloride coating concentration ranges between about $3.9 \times 10^{-5}$ and $8.8 \times 10^{-5}$ grams per square inch of copper electrode wire surface area which may be readily achieved from aqueous solutions containing approximately one percent sodium chloride. We have also found that satisfactory welding performances may be achieved with solution concentrations extending up to about 10% sodium chloride, the range of concentration for optimum performance being approximately ½ to 1% sodium chloride. The weight of sodium chloride deposited per unit surface area of electrode wire may be varied in accordance with the effectiveness of the wiper. It is believed that the efficacy of the instant invention is not dependent on the gauge of copper electrode wire employed provided that the sodium chloride coating quantities fall within the aforedescribed limits. The copper electrode wire may partake of any of the commercial products available, a typical composition being presented below by way of illustration and not of limitation:

| Element: | Weight percentage |
|---|---|
| Copper | 98.0 minimum with silver not exceeding 0.01. |
| Tin | 0.65–0.90. |
| Zinc * | 0.20 max. |
| Silicon | 0.15–0.40. |
| Manganese | 0.10–0.30. |
| Lead * | 0.02 max. |
| Phosphorus | 0.005 max. |
| Aluminum * | 0.01 max. |

\* The total of zinc, lead and aluminum with iron, nickel and others shall not exceed about 0.50 weight percent.

The aforediscussed method has proved very useful in the welded overlaying of artillery projectiles with copper base filler wire. In the use of the copper base filler wire, it is preferable to connect the positive side of a direct current source to the wire and the negative side to the work.

Instead of conveying the coatings to the arc as indicated above, those skilled in the art will understand that the sodium chloride may be introduced into the vicinity of the arc in other ways. It is believed that the sodium chloride in the vicinity of the arc is what minimizes or eliminates spatter.

Different theories may be advanced to explain the inherent ability of the sodium chloride solution to stabilize the electrical forces of the welding arc. One possible explanation for the above-described direct current method is that the sodium is converted into metallic sodium vapor by the intense heat of the arc and is transported across the arc to the cathode or weldment where it condenses in the form of an atomic film which lowers the work function of the weldment in the arc region. Nascent oxygen formed from the water base solution may also contribute to the lowering of the work function in a similar manner. Lowering of the work function increases the ratio of negative electrons to positive ions, and spatter is eliminated as a result of this increased ratio.

Another possible theory is that the chlorine vapor, which is produced when the sodium chloride vaporizes in the intense heat of the welding arc, stabilizes the arc and thereby eliminates or minimizes spatter. In this connection, it has been observed that chlorine has the ability to eliminate porosity in certain non-ferrous welded applications. The reason for this is not clearly understood at the present time. Whatever theory may prove to be correct, the use of the sodium chloride solution has conclusively demonstrated its ability to eliminate substantially all the spatter heretofore incident to the welding operation.

During the development of this invention, an auxiliary wire, without an impressed current or emissive coating, was used to increase the deposition rate of the overlay and to minimize the depth of overlay fusion. In addition, the materials that were overlayed had the geometrical form of a cylinder instead of the box-like configuration shown in the drawing. Since these modifications have no influence upon the stableness of the electric arc, they do not in any way alter the effectiveness of the invention. For this reason, the modifications were not included in the drawing whose purpose is to explain the essentials of the invention.

We claim:

1. A process for depositing a high copper alloy electrode onto a metallic base with an electric arc formed by a unidirectional current with the electrode anodic and the base cathodic, the combination therewith of the improvement for reducing electrode spatter from the arc upon the base, said improvement comprising the step of uniformly applying sodium chloride to said electrode prior to arcing between said base and said electrode in an amount ranging between about $3.9 \times 10^{-5}$ and $8.8 \times 10^{-5}$ grams per square inch of copper electrode surface area.

2. A process for the welded overlaying of artillery projectiles and the like with a copper base filler electrode wire by means of an electric arc formed by a unidirectional current with the wire anodic and the projectile cathodic, the combination therewith of the improvement for reducing electrode wire spatter from the arc upon the projectile, said improvement comprising the step of introducing sodium chloride in vicinity of said arc in an amount ranging between about $3.9 \times 10^{-5}$ and $8.8 \times 10^{-5}$ grams for each square inch of electrode consumed.

References Cited in the file of this patent

UNITED STATES PATENTS

| | | |
|---|---|---|
| 123,296 | Schurr et al. | Jan. 30, 1872 |
| 1,728,863 | Ipsen | Sept. 17, 1929 |
| 2,681,970 | Koopman | June 22, 1954 |
| 2,852,659 | Belz et al. | Sept. 16, 1958 |